United States Patent [15] 3,648,915
Leibfried et al. [45] Mar. 14, 1972

[54] ARRANGEMENT FOR SOLDERING A TERMINAL TO A SEMICONDUCTOR

[72] Inventors: Wolfgang Leibfried, Leonberg; Guenther Schmid, Stuttgart-Moehringen; Alfred Ortlieb, Stuttgart-Vaihingen; Horst J. Hartmann, Schnait; Eberhard Tittes, Wernau, all of Germany

[73] Assignee: Robert Bosch GmbH, Stuttgart, Germany

[22] Filed: Feb. 6, 1970

[21] Appl. No.: 9,283

Related U.S. Application Data

[62] Division of Ser. No. 706,257, Feb. 19, 1968.

[52] U.S. Cl. ................................. 228/37, 29/503, 118/300, 228/36
[51] Int. Cl. ......................................................... B23k 1/08
[58] Field of Search ............... 228/36, 37, 38; 117/113, 114; 118/259, 300, 400; 29/471.1, 503

[56] References Cited

UNITED STATES PATENTS 3,386,166  6/1968  Tardoskegyi .......................... 228/37 X
3,482,755  12/1969  Raciti ................................. 228/37 X

FOREIGN PATENTS OR APPLICATIONS 809,883  3/1959  Great Britain .......................... 228/37

Primary Examiner—John F. Campbell
Assistant Examiner—Robert J. Craig
Attorney—Michael S. Striker

[57] ABSTRACT

An arrangement for soldering together an electrode to a semiconducting element. Melted solder is directed in a stream of circular cross section against one of the two parts to be joined together. Depending upon the velocity of the stream of solder, more or less solder is deposited upon the part to which the stream is applied. The joining of the elements takes place t through a second reheating process in which the deposited solder softens and joins the parts together. An automatic transport mechanism leads the parts to which the solder stream is applied into the area of the solder flow. The stream of solder emerges from a reservoir of melted solder and is returned to the latter after following a parabolic-shaped path.

28 Claims, 7 Drawing Figures

PATENTED MAR 14 1972 3,648,915

INVENTORS
Wolfgang LEIBFRIED
Günther SCHMID
Alfred ORTLIEB
Horst Joachim HARTMANN
Eberhard TITTES

ATTORNEY

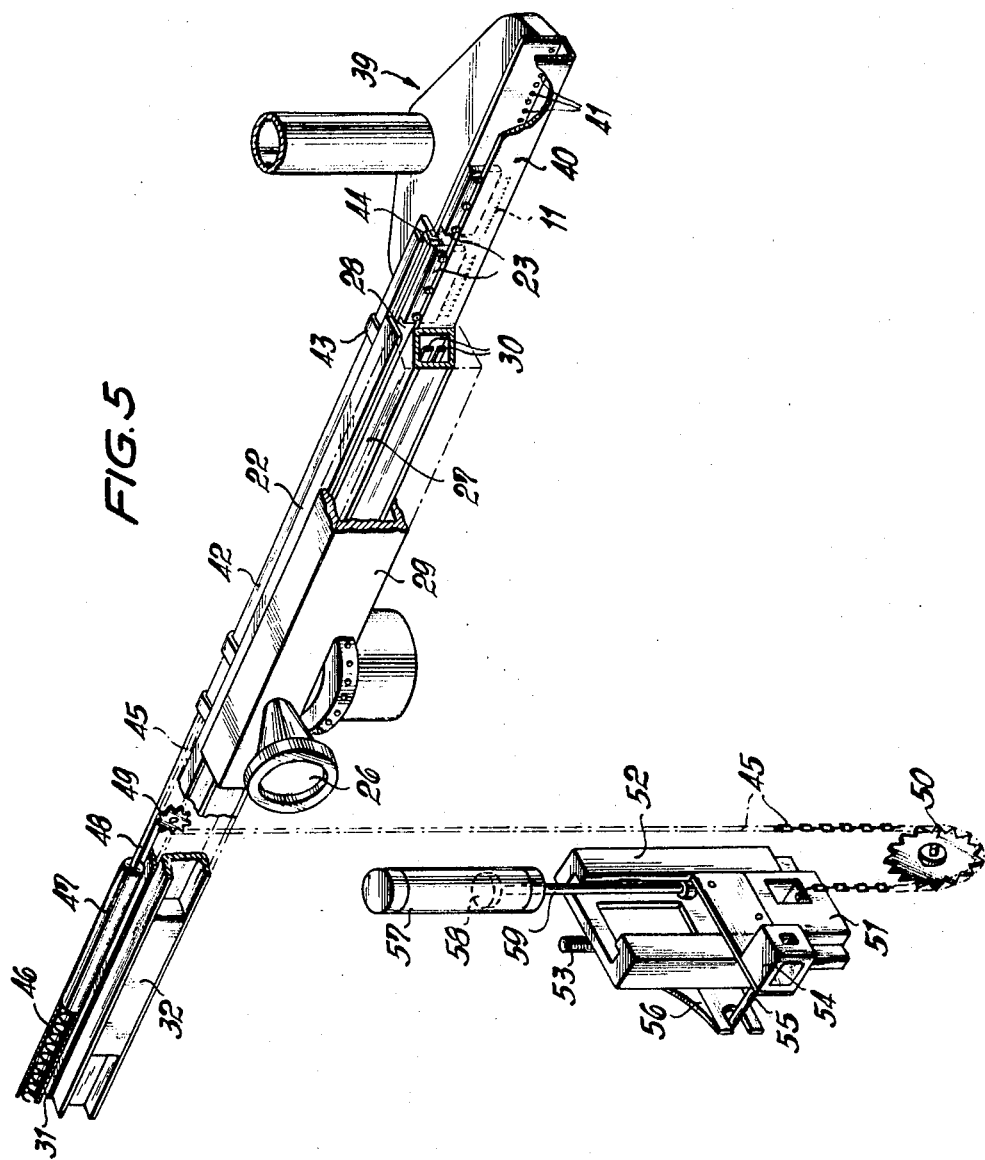

INVENTORS
Wolfgang LEIBFRIED
Günther SCHMID
Alfred ORTLIEB
Horst Joachim HARTMANN
Eberhard TITTES

ATTORNEY

ARRANGEMENT FOR SOLDERING A TERMINAL TO A SEMICONDUCTOR

CROSS-REFERENCE TO RELATED APPLICATION

The present application is a division of our patent application Ser. No. 706,257, filed Feb. 19, 1968.

BACKGROUND OF THE INVENTION

In most of the semiconductors, the power carrying capacity is dependent upon the properties and characteristics of the connecting electrodes. The connecting electrodes should have low electrical contact resistance, high thermal conductivity, and high mechanical rigidity.

In the conventional processes cavities are more or less retained in the solder joints between the metallic connecting electrodes or terminals and the semiconductor member. As a result of such cavities within the joint, the effective cross section of the joint is decreased. At the same time, the resistance across the joint is increased while the thermal conductivity and the mechanical strength of the joint are both decreased.

Accordingly, it is an object of the present invention to prevent the preceding disadvantages in the art. In particular, it is an object of the present invention to provide an arrangement for soldering metallic conductors to a metallized semiconductor. It is the purpose of the present invention to leave a soldered joint between semiconductor and connecting electrode free of voids or cavities.

In accordance with the present invention, the object is achieved by providing a protective gas atmosphere free of oxygen. The fluid solder is applied to at least one of the two parts to be joined together in the protective atmosphere. The parts to be joined by the solder are then soldered together without the use of a flux agent. It is particularly advantageous when the final joining of the two parts, which have solder preapplied to them, are joined together finally in a protective atmosphere which is free from oxygen. For purposes of obtaining the soldered connection, the fluid solder is applied to the part in question by means of a solder stream which is tapped from a solder reservoir close to the bottom thereof. The solder stream can be led into a groove.

The present invention has been particularly applicable to semiconductors in which the upper surface has two or more sharply bordered metallic contact layers. The remaining surface of the semiconductor is either uncoated or covered with a nonmetallic layer such as, for example, an oxide layer. When a semiconductor with such an upper contacting surface is exposed to a stream of solder, only the solderable surfaces become covered with solder. The uncoated surfaces of the semiconductor remain free of any solder covering. This applies, to semiconductors which are produced through planar processes and are provided with at least one contacting upper surface having an oxide layer preapplied to it. The semiconductor is provided with contact windows which are filled with a connecting metallic contact layer. The arrangement in accordance with the present invention is especially advantageous when used in conjunction with transistors having exceedingly small elements and a narrow structural separation between emitter and base. Thus, even when such surface separation is of the order of 3 $\mu$m. between the metallized surfaces, the applied solder does not give rise to any conducting bridges or short circuits.

SUMMARY OF THE INVENTION

An arrangement for soldering an electrode to semiconducting elements. A mass of solder is heated in a reservoir to its molten state. The molten solder is tapped or drawn off from the reservoir near its bottom and formed into a relatively high velocity stream having preferably a circular cross section. The stream is allowed to form a parabolic-shaped path between the exit of a tube from which the molten stream emerges and the reservoir to which the molten solder is returned. An electrode to which the solder is to be applied is brought in contact with the stream of solder at the top or peak of the parabola. In an inert atmosphere the action of the moving stream of solder passes the electrode, causing a predetermined quantity of solder to adhere to the electrode. This adhering quantity of solder becomes distributed across the surface of the electrode and forms a curved surface resembling the surface of an optical lens. The amount of solder thus deposited upon the electrode is dependent upon the relative velocity between the soldering stream and the electrode, and may, therefore, be varied by varying the velocity of the soldering stream. After the electrode with its deposited amount of solder is removed from the path of the soldering stream, it is reheated in an inert atmosphere while it is in contact with the semiconducting element to which it is to be attached. After a sufficient amount of reheating the joint is allowed to cool, and the electrode remains firmly soldered to the semiconducting element.

The novel features which are considered as characteristic for the invention are set forth in particular in the appended claims. The invention itself, however, both as to its construction and its method of operation, together with additional objects and advantages thereof, will be best understood from the following description of specific embodiments with reference to the accompanying drawing.

BRIEF DESCRIPTION OF THE DRAWING

FIG. 5 is a perspective view of the automatic transport mechanism for transporting the electrode, upon which solder is to be deposited, through the process, in accordance with the present invention;

DESCRIPTION OF THE PREFERRED EMBODIMENTS

Figure 1:
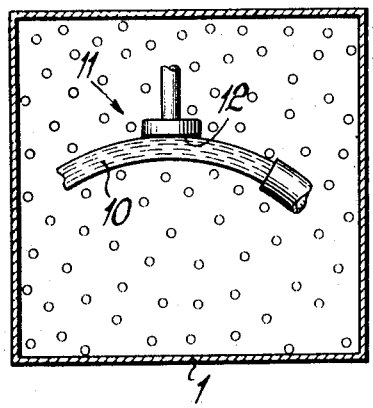
FIG. 1 is a schematic illustrative diagram showing the principle of the soldering operation, in accordance with the present invention, in which a stream of solder is directed against the electrode to be soldered to the semiconductor.
Figure 2:
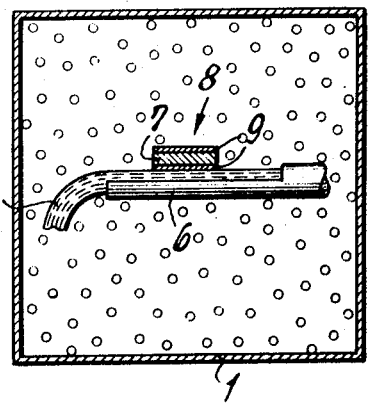
FIG. 2 is a schematic illustrative diagram showing the principle of another embodiment of FIG. 1, in which the solder stream is directed against a selected surface of the semiconductor.

FIGS. 1 and 2 illustrate schematically the principle of the present invention. FIG. 1 shows the manner in which solder is applied to a connecting electrode 11 which is, for example, shown in the form of a wire having a head. FIG. 2 illustrates the application of solder to a metallized semiconductor 8 in which the metallic contact layer is designated by the reference numeral 9. The uncoated semiconductor slice is denoted by 7. The connecting electrode 11 can, for example, be made of copper and can also be provided with a metallic contact layer made, for example, of nickel.

The principle of the process is the same for both FIGS. 1 and 2. A confined space 1 is filled with a reducing protective gas which is free of oxygen. Solder flow in the form of, for example, a solder stream 10 is produced and directed by a trough in the case of FIG. 2. The part or member 11 or 8 to which the solder is to be applied, is brought in contact with the flow of solder so that the metallized or metallic surfaces become coated with solder. Through unique techniques, the solder flow is free of any slag. This is accomplished by tapping the solder from the reservoir which contains the melted mass, close to the bottom of the reservoir.

As a result, the solder is free of any voids, and the soldered joints between the parts to be joined together are also free of voids.

The application of the solder to the parts to be joined, in both embodiments of FIGS. 1 and 2, is accomplished with the aid of a channel through which oxygen-free gas streams. The parts to which the solder are to be applied are transported through this channel, before they are brought in contact with the solder flow. The parts are heated before they are exposed to the solder flow and are cooled afterward.

For purposes of soldering together the parts which are to be joined, one or both of the parts to which solder had been previously applied, are brought together and finally joined through a second heating process. The parts are thereby again transported through the channel in which oxygen-free gas passes. In this channel the parts are first heated and then cooled again after they have been soldered together.

The application of special fluxing agents are not required or necessary in accordance with the present invention. When fluxing agents are used, residual matter results which do not lead to a soldered joint free of voids.

In the case of the embodiment of FIG. 2 a mask of crisscross strips is applied to the uncoated semiconductor slice 7 before exposing to the solder. This mask is made of a varnish or coating of pitch or asphalt covering material. The crisscross pattern subdivides the slice into small elemental regions. After that the slice is covered with a metallic contact layer 9. In the situation under consideration, such a contact layer is made of nickel which is not applied by means of a flow process. The contact layer 9 is deposited only upon those individual regions which are not masked. The regions covered by the crisscross strips remain free of the coating due to the varnish. The crisscross pattern made of the varnished strips is then removed. As a result, the slice is provided with a crisscross pattern which is free of any metallic contact deposit. This exposes the upper surface of the semiconductor and subdivides the slice 7 into individual elements to which solder may be applied.

The contacting silicon slices 8 are presoldered through contact with the streaming solder flow. Only the solderable individual elements on the contact layer 9 are treated with solder. The dividing strips of the crisscross pattern are not solderable and therefore remain free of all solder. As a result, the presoldered slices exhibit bare dividing lines which subdivide the area into individual elements. The latter are then soldered to connecting terminals 11 as described above.

This second method of soldering terminals to the semiconductor in accordance with the concept of FIG. 2, is more complex when applied to the structure of the usual diodes. In the latter case the concept of FIG. 1 would be the more simpler and desirable one. If, however, semiconductor elements are used with a planar structure having a masked oxide layer at the surface, then this process is no more complex than that described by FIG. 1. This applies if contact windows are to be inserted into the masked oxide layer. In transistors having very small or fine elements with very narrow spaces between emitter and base surfaces, it is of advantage when the connecting contact or terminal has the solder applied to it. When connecting the electrode to the semiconductor afterward, the narrow and long metallized gaps do not become covered with solder.

When fabricating transistors, it is an advantage to combine the processes illustrated in FIGS. 1 and 2. The side or surface of the semiconductor slice 8 having the structure of the base and the emitter, is exposed to the solder flow so as to deposit solder onto this side of the semiconductor. The other side of the semiconductor, on the other hand, is joined to the electrode at its collector surface. This electrode for the collector has solder preapplied to it.

Figure 3:
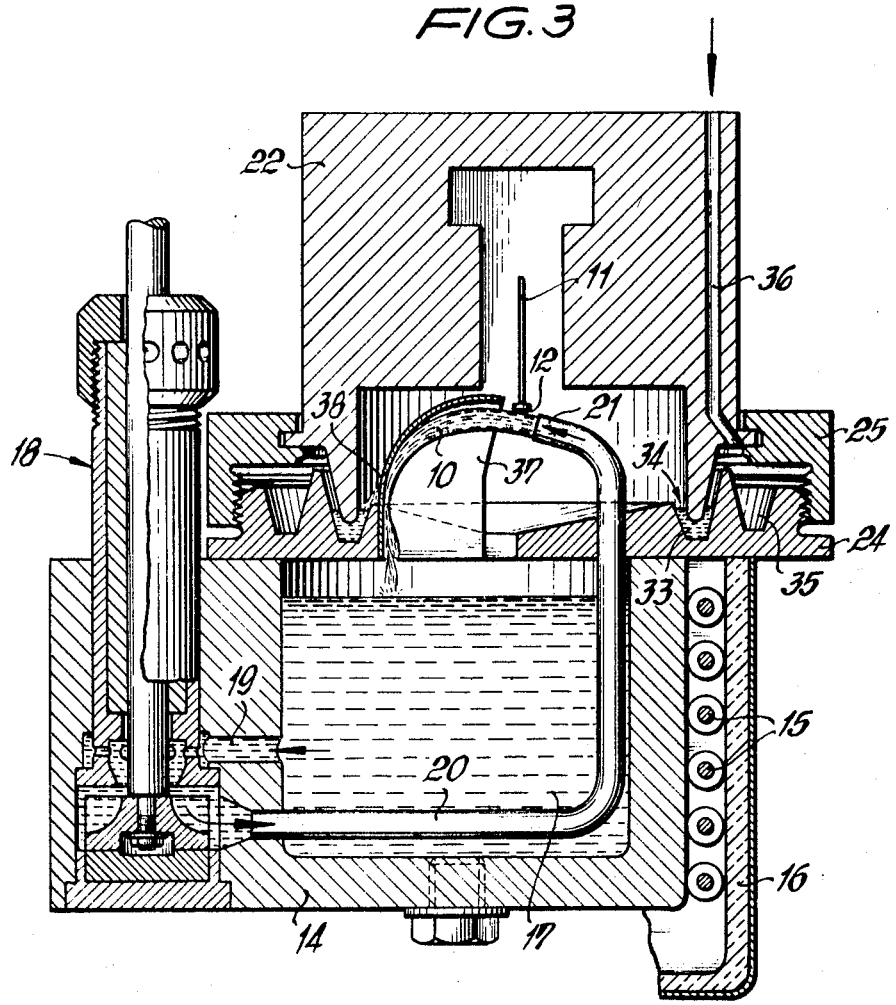
FIG. 3 is an elevational cross-sectional view of the arrangement for forming the soldering stream and applying to an electrode, in accordance with the present invention, and shows the pump for obtaining the soldering stream and the automatic transport mechanism for the electrode.

FIGS. 3 and 5 illustrate the most important step of the process, and deals with the application of the solder. For the case of the embodiment of FIG. 1, these figures illustrate a complete arrangement for applying this solder. It will be understood, however, that the process as illustrated therein, is not limited to this embodiment.

The means for producing the solder stream 10 are shown in FIG. 3. A reservoir 14 confines a large amount of the solder. The latter consists of an alloy of lead and tin, preferably in the proportion of 92 percent lead and 8 percent tin. The reservoir 14 is heated with a heating coil arrangement 15 which surrounds the reservoir. An insulating wall 16 covers the exterior of the heating coil arrangement so that the latter may heat the solder 17 in the reservoir 14 until it is melted. The melted solder is tapped from the reservoir through a duct or tubular opening 19 which is immediately above the bottom of the reservoir. The solder is drawn through the duct 19 by means of a centrifugal pump 18 and forced through a tube 20. The melted solder exits from the tube 20 through a nozzle 21 which forms the solder into a stream 10.

In order that the temperature of the solder stream 10 does not drop substantially below the temperature of the fluid solder 17 within the reservoir 14, the tube 20 leads through the fluid mass 17, for the larger proportion of its path. After its exit from the nozzle 21, the solder stream 10 contacts the surface 12 of the electrode 11. The latter is moved perpendicular to the direction of the stream which leaves a layer of solder behind upon the contact surface 12 of the electrode. Depending upon the velocity of the stream, the residual solder layer will have a lens-shaped surface or a planar surface. The end of the solder stream 10 returns into the reservoir 14 after following a parabolic path determined by the action of gravity.

Figure 4:
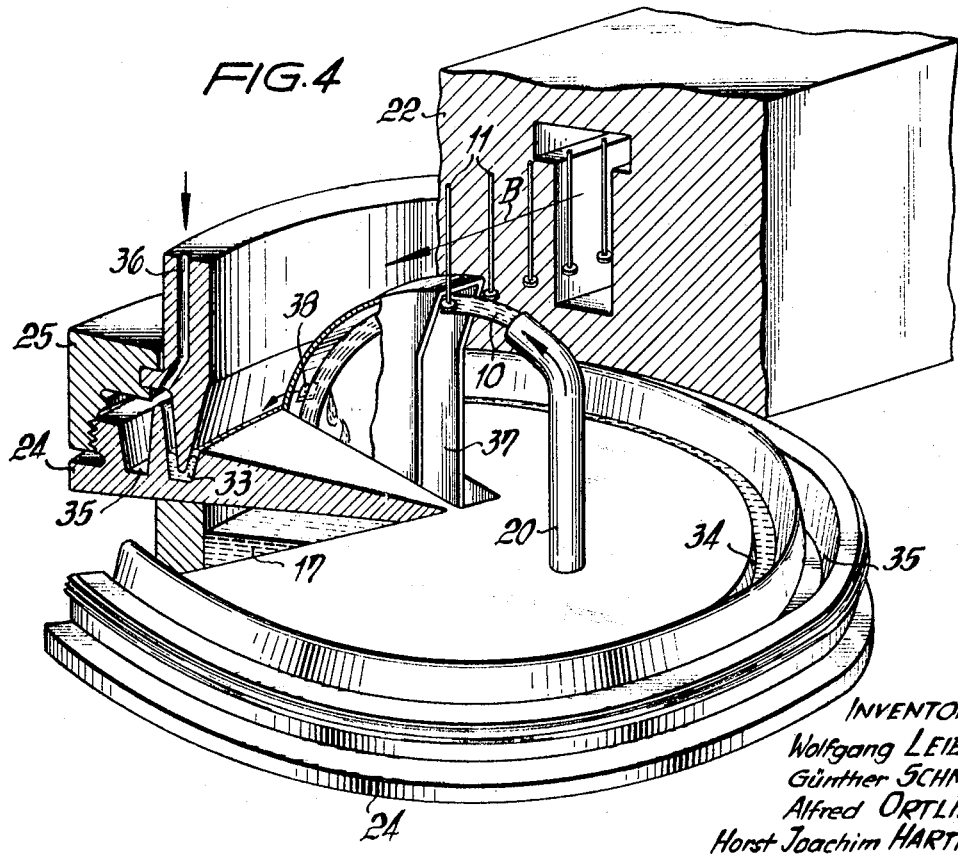
FIG. 4 is a perspective view of a portion of the structure shown in FIG. 3.

As illustrated schematically in FIG. 4, a plurality of electrodes are transported by means of a transport chain through a guidance channel 22 and onto the solder stream 10. The transport action is such that each individual electrode is brought successively in contact with the solder stream.

For purposes of driving the electrode 11, an automatic arrangement in accordance with FIG. 5 is provided. This arrangement includes magazines 23 for moving the electrodes through the guidance channel 22. By varying the velocity of the solder stream 10, the residual solder may be varied over broad limits. When varying the solder stream velocity, however, the height of the peak of the stream is also varied. As a result an adjustment is required in the distance between the electrodes and the solder stream when the latter is varied in velocity. For purposes of executing such adjustments, a threaded arrangement 25 is provided between the guidance channel 22 and the cover 24 of the reservoir 14. Through means of this threaded rotatable arrangement 25 the guidance channel 22 is movable in a vertical direction. With the aid of an observation glass or opening 26, the adjustment in the height of the guidance channel 22 may be observed. The observation window 26 is directed upon the contact location between the electrodes and the soldering stream, as shown in FIG. 5.

Before applying the solder, the electrodes must have their oxide layer removed from the contact surfaces 12. These oxide layers are continuously generated through exposure to the atmosphere air. The removal of the oxide layer is accomplished by exposing the electrode to a reducing gas atmosphere having a temperature of approximately 560° C. within the guidance channel 22. Thus, the oxide layer on the electrode to be soldered is removed prior to the instant that the electrode reaches the solder stream 10.

Two heating channels 27 at each side of the guidance channel 22 are provided for the purpose of heating the protective gas which is derived from a cool state. This protective gas may consist of hydrogen or a mixture of hydrogen and nitrogen. In FIG. 5, only the heating channel facing the observer is illustrated. The heating channel 27 extends in an axial direction from the entrance opening 28 of the guidance channel, to the proximity of the solder stream 10. A covering 29 thermally insulates the heating channel from the exterior environment. The heating channels are electrically heated through two axial heating rods. The side supports of the heating rods are designated by the reference numeral 30 in the case of the channel facing the observer. The heated protective gas exits from the heating channels 27 at the top of the reservoir 14 and into the guidance channel 22. The gas streams through the latter in the right and left directions and passes out of the guidance channel after flowing through the entrance and exit openings of the magazine 23.

In order to prevent the electrodes 11 from becoming severely oxidized upon entering the atmospheric air, the electrodes are first cooled to room temperature before leaving the guidance channel 22. A cooling channel 32 is, for this purpose provided at the exit opening 31 at both sides of the guidance channel 22. The electrodes are firmly held within the magazines 23 and the latter are in continuous contact with the inner wall of the guidance channel 22. As a result the cooling of the electrodes is achieved through heat conduction across the magazines 23.

In order to prevent oxygen from interpenetrating the protective gas within the unsealed contact spaces between the threaded member 25 and the cover 24 as well as between a threaded member 25 and guidance channel 22, a sealing ring 33 is provided between the guidance channel 22 and the cover 24. This sealing ring is essentially comprised of solder. In operation, however, this sealing ring does not equalize the applied pressure of the protective gas in the guidance channel. For this reason an overflow groove 35 is provided concentric with the sealing groove 34 at the exterior of the cover 24. This overflow groove 35 receives the overflowing solder.

In order to achieve a secure sealing arrangement, with larger pressures of the protective gas in the guidance channel, a feed tube 36 is further provided. By means of this tube 36, protective gas can be conducted into the overflow groove 35. The protective gas passed through the groove 36 is made to have the same pressure as that prevailing in the guidance channel 22 as a result of the protective gas streaming thereinto. In this manner, both sides of the sealing ring 33 are maintained at the same height during operation.

Even with the preceding arrangement, it is possible that overflow occurs from the sealing ring 33 into the overflow groove 35, when unforeseen pressure variations appear during operation. For this reason, an excess flow arrangement is provided which assures that the sealing ring 33 operates reliably even when temporary pressure differences prevail between the sealing groove 34 and the overflow groove 35. This excess flow arrangement consists of a hood 37 which is parabolically shaped to correspond to the soldering stream. The returning solder stream 10 is received by the hood in a tangential manner. A deflection window 38 is inserted into the hood 37 above the space provided for the sealing ring. A portion of the solder being returned into the reservoir, flows through this open window and into the sealing groove 34, when the latter is not filled with lead to the prescribed height.

It is also the purpose of the receiving hood 37 to decelerate or slow down the returning stream of solder into the reservoir 14. As a result the number of suspended particles is maintained at a minimum. The suspended particles arise from the impact of the solder stream into the mass of the reservoir.

In order to prevent the transfer of such suspended particles into the surrounding atmosphere or environment by the protective gas streaming from the guidance channel, the suction arrangement is provided at both of the openings 28 and 31 of the guidance channel. Of these two suction arrangements, FIG. 5 shows only the one 39 which is associated with the entrance opening 28. This suction arrangement is secured to the groove 40 serving for the purpose of threading on the magazine. The suction arrangement draws the hot streaming gas exiting from the entrance opening 28, through means of a plurality of bores 41 located in the groove. This action of the suction arrangement takes place without disturbing or influencing the characteristics of the stream in the guidance channel 22.

Figure 7:
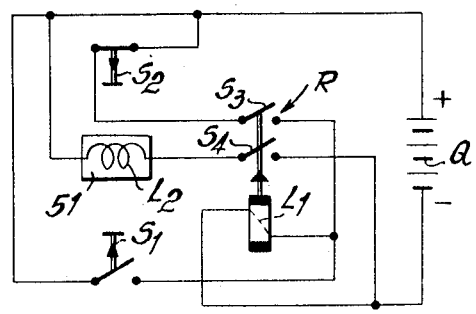
FIG. 7 is an electrical circuit diagram of the elements used to operate the transport mechanism of FIGS. 5 and 6.
Figure 6:
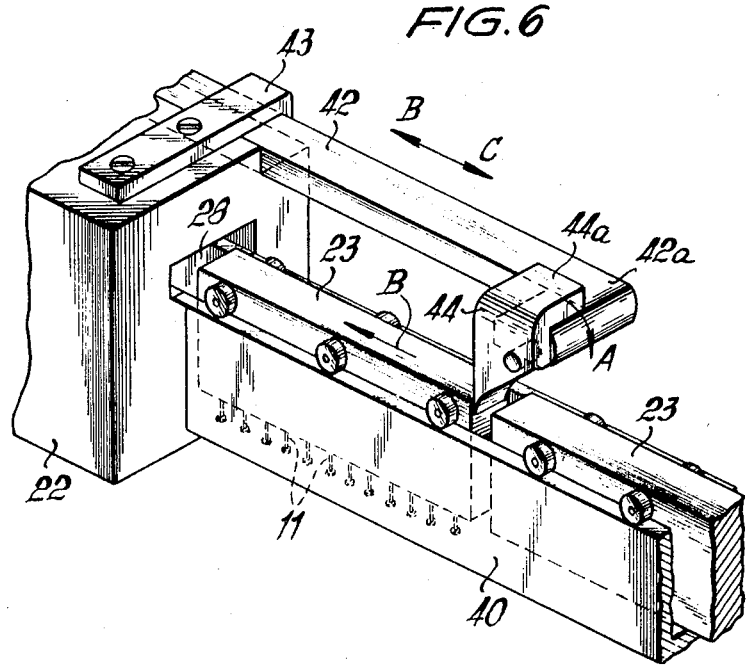
FIG. 6 is a perspective view of a portion, in magnified form, of the transport mechanism of FIG. 5.

The arrangement for automatically transporting the connecting electrodes, is shown in FIGS. 5 to 7. A draw member 42 serves as the draw rod. As a result of a recess in the external wall of the guidance channel 22, the draw member 42 is axially movable with the aid of a support 43. A gripper 44 is mounted at the end of the draw member 42 facing the entrance opening 28 of the guidance channel. This gripper 44 serves the purpose of moving or transferring the magazine 23 into the guidance channel 22. The position of the rotational axis of the gripper with respect to its center of gravity is selected so that the gripper tends to swing against the direction of the arrow A and into the operating position shown in FIG. 6, under the action of gravity. In this operating position of the gripper, the upper tab 44a lies upon the covering surface 42a of the draw member 42.

A chain 45 is secured to the end of the draw member 42 facing the entrance opening 28 of the guidance channel. This chain drives the draw member in the transport direction of the magazine 23 and against the action of a return spring 46. The return spring 46 is also mounted at the exterior wall of the guidance channel and tends to force the draw member 42 into the initial position shown in FIG. 5 by means of an intermediate member 48 which is guided within a guiding tube 47.

Starting from the draw member 42, the chain 45 becomes first deflected through a sprocket 49 mounted to the guidance channel. This deflection is in the downward direction. The second sprocket 50 also secured to the guidance channel serves to deflect the chain 45, afterwards, in an upward direction. The end of the chain 45 which is deflected upwards, is secured to a slide 51. The latter is vertically movable within a guide member 52. The slide 51 is intermittently driven by an electric motor which is not shown and is continuously driven at constant velocity. A threaded spindle 53 is provided next to the slide and secured or linked to the motor so as to be driven thereby. The axis of the spindle is parallel to the direction of motion of the slide. The latter cooperates in operation with a semi-spindle nut, not shown, secured to the slide.

The semi-spindle nut is brought into and out of engagement with the threaded spindle 53 by means of the action of an electromagnet or solenoid 54. The armature 55 of the latter is connected with the spindle nut by means of a rocker arm 56. The pitch of the threaded spindle is designed or selected so that the slide 51 is transported or transferred upward when the spindle nut engages the spindle 53. When the semi-spindle nut becomes disengaged from the threaded spindle, the slide 51 drops in the downward direction through the action of gravity.

The reversing points of the slide 51 in its up and down motion, are determined by the contact switches $S_1$ and $S_2$. The switches are schematically shown in FIG. 7 which includes the circuit associated with the switches. The switches are located at the top and lower end of the path of motion of the slide and become actuated by the slide itself. The switch $S_1$ is connected as a normally open switch, whereas the switch $S_2$ is normally closed.

In accordance with FIG. 7, the switches $S_1$ and $S_2$ operate in conjunction with a relay R having two switching contacts $S_3$ and $S_4$. The relay R is designed so that the switching contacts $S_3$ and $S_4$ are released and in the circuit open position when the relay coil $L_1$ is deenergized.

The circuit elements $S_1$, $S_2$, R are interconnected with a power supply Q and the coil $L_2$ of the electromagnet or solenoid 54 as follows: The series circuit of the coil $L_2$ and switching contact $S_4$ are connected across the operating power supply Q. Also connected across the power supply Q is the series circuit including the switch $S_2$, the relay contact $S_3$, and the relay coil $L_1$. Furthermore, the connecting path between the switch $S_3$ and the relay coil $L_1$ are connected to the positive terminal of the power supply Q, by way of the switch $S_1$.

When the relay contacts $S_3$ and $S_4$ are in their open positions, the coil $L_2$ of the electromagnet or solenoid, is deenergized. As a result the semispindle nut is released and the slide 51 drops downward. When the slide 51 reaches the bottom end of its path of motion, the switch $S_1$ becomes closed. As a result the coil $L_1$ becomes energized and the relay contacts $S_3$ and $S_4$ become closed. This action applies current to the solenoid coil $L_2$. The semispindle nut then becomes engaged with the threaded spindle 53 and the slide 51 moves in the upward direction. The switch $S_1$ is thereby reopened. The relay coil $L_1$ now receives current by way of the circuit path including the switch $S_2$ and the relay contact $S_3$. When the slide 51 acts or abuts against the switch $S_2$, the relay coil $L_1$ becomes again deenergized and thus releases or opens the relay contacts $S_3$ and $S_4$. This marks the beginning of a new cycle.

The controlled up and down motion of the slide 51 as described supra, produces the effect that the draw member 42 is moved back and forth in a synchronous manner. Thus, whenever, the slide 51 moves upward, a magazine 23 is pushed into the guidance channel in the direction of the arrow B in FIG. 6, through means of the gripper 44. The magazines 23 are threaded in the groove 40 and can be gripped one after another by the gripper.

Upon the downward motion of the slide 51, the draw member 42 becomes moved in the direction of the arrow C as a result of the return spring 46. The gripper 44 swings thereby in the direction of the arrow A and over the magazine which is to be transported next. Through the action of gravity, the gripper 44 then swings to its operating position by rotating in the direction of the arrow A.

As a result of the operating stroke of the gripper 44 in the direction B, the magazines in the guidance channel are all advanced further by the amount corresponding to a magazine length. Upon the return motion of the gripper, all of the magazines in the guidance channel remain stationary. During this stationary position of the magazine, the solder stream 10 is in the gap between two neighboring magazines.

A braking arrangement is provided to prevent heavy impact of the slide 51 at the lower end of its path of motion. This braking arrangement includes a cylinder 57 in a vertically mounted position, and a piston 58. The piston rod 59 is secured to the slide 51. Port openings are provided at the top and bottom of the cylinder 57 for the purpose of allowing air to be throttled in and out of the cylinder. The ports are designed so that severe braking action is realized when the slide drops in the downward direction. The design is such, at the same time, that the slower upward motion of the slide remains unaffected by this braking arrangement.

It is to be noted that the present invention is also applicable when the solder is applied to the semiconducting element rather than the connecting electrode. The solder can also be applied to both the connecting electrode and the semi-conducting element.

It will be understood that each of the elements described above, or two or more together, may also find a useful application in other types of joining arrangements of electrodes to semiconductors differing from the types described above.

While the invention has been illustrated and described as embodied in joining arrangements of electrodes to semiconductors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the claims.

What is claimed as new and desired to be secured by Letters Patent is set forth in the appended claims:

1. An arrangement for soldering at least one metallic electrode member to a metallized semi-conducting means comprising, in combination, means for maintaining an inert atmosphere within a predetermined space; solder heating means for heating solder to its melting temperature; reservoir means for confining a predetermined quantity of melted solder; nozzle means for forming a stream of melted solder of circular cross section within proximity of the top of said reservoir; support means for supporting a member to which melted solder is to be applied in the path of said stream of melted solder, said support means moving said member into and out of said stream having a predetermined velocity and allowing a predetermined quantity of solder to adhere to said member, said predetermined quantity of solder adhering to said member depending upon the relative velocity between said stream and said member; cooling chamber means for allowing the solder adhering to said member from exposure to said stream to solidify; and reheating means for reheating the solder adhering to said electrode while in contact with semiconducting means, whereby said electrode is conductively joined to said semiconducting means while in an inert atmosphere.

2. The arrangement as defined in claim 1 including cover means for covering said reservoir means and having an opening for passing said stream of melted solder, said stream following a parabolic shaped path upon emerging from said nozzle means and returning to said reservoir means.

3. The arrangement as defined in claim 2 wherein said support means includes a guidance channel on said cover means for guiding the movement of said member through said stream of melted solder.

4. The arrangement as defined in claim 3 including magazine means for retaining a predetermined number of said members to be exposed to said stream of melted solder.

5. The arrangement as defined in claim 4 including rotatable threaded means between said guidance channels and said cover means for movably adjusting the vertical position of said guidance channel.

6. The arrangement as defined in claim 5 including heating channel means at the entrance opening of said guidance channel for heating said guidance channel.

7. The arrangement as defined in claim 6 including cooling channel means at the exit opening of said guidance channel for cooling said guidance channel in the proximity of said exit opening.

8. The arrangement as defined in claim 7 including ring-shaped sealing means of fluid solder between said guidance channel and said cover means.

9. The arrangement as defined in claim 6 including overflow receiving means in said cover means and concentric with said ring-shaped sealing means for receiving solder overflow from said sealing means.

10. The arrangement as defined in claim 9 including inert protective gas means having a predetermined pressure; and tube means for conducting said inert protective gas means into said overflow receiving means, the pressure of said gas means being conducted into said overflow receiving means being substantially equal to the pressure prevailing within said guidance channel.

11. The arrangement as defined in claim 10 including receiving hood means for tangentially receiving said stream or solder following a parabolic-shaped path.

12. The arrangement as defined in claim 11 including transport means for transporting through said guidance channel the member upon which the solder is to be applied.

13. The arrangement as defined in claim 12 wherein said transport means has a draw member movable back and forth along an axis parallel to the axis of said guidance channel.

14. The arrangement as defined in claim 13 wherein said receiving hood means has a deflecting window means above said ring-shaped sealing means for deflecting a portion of the solder stream returning to said reservoir means into said sealing means when not filled to a predetermined height.

15. The arrangement as defined in claim 14 including suction means at each end of said guidance channel.

16. The arrangement as defined in claim 15 including transport means for transporting through said guidance channel the member upon which the solder is to be applied.

17. The arrangement as defined in claim 16 wherein said transport means has a draw member movable back and forth along an axis parallel to the axis of said guidance channel.

18. The arrangement as defined in claim 17 including gripping means rotatably secured to said draw member for driving said magazine means.

19. The arrangement as defined in claim 18 wherein said gripping means has an upper tab member, the rotational axis of said gripping member being located relative to the center of gravity of said gripping member so that the action of gravity tends to swing said gripper in the direction whereby said tab member lies upon a surface of said draw member.

20. The arrangement as defined in claim 19 including chain means at the entrance of said guidance channel for driving said magazine in the transport direction through said guidance channel; and return spring means acting against the driving motion of said chain means.

21. The arrangement as defined in claim 20 including first sprocket means for deflecting said chain means from a horizontal direction to a vertical direction.

22. The arrangement as defined in claim 21 including second sprocket means rotatably secured below said guidance channel for deflecting said chain means from a vertically downward direction to a vertically upward direction.

23. The arrangement as defined in claim 22 including a slide member connected to a portion of said chain means moving in a vertically upward direction; and slide guide means for guiding the motion of said slide member in a vertical direction.

24. The arrangement as defined in claim 23 wherein said slide member is driven with constant velocity.

25. The arrangement as defined in claim 24 including threaded spindle means in the proximity of said slide member and having an axis parallel to the direction of motion of said slide member; and threaded spindle nut means secured to said slide member and cooperating with said threaded spindle means.

26. The arrangement as defined in claim 25 including electromagnetic means acting upon said threaded spindle nut means for engaging and disengaging said threaded spindle nut means with said threaded spindle means, the pitch of said threaded spindle means being arranged so that said slide member is transported in an upward direction when said threaded spindle nut means is engaged with said threaded spindle means.

27. The arrangement as defined in claim 26 including first switching means located within the path of said slide member and being actuated by said slide member when at an extreme upper position; second switching means located in the path of said slide member and actuated thereby when said slide member is at an extreme lower position; and circuit means connected to said switching means and controlling said electromagnetic means whereby said slide member is continuously moved back and forth between said first and second switching means.

28. The arrangement as defined in claim 27 including braking means for inhibiting rapid downward motion of said slide member.

* * * * *